Sept. 7, 1937.  E. J. BRASSEUR  2,092,241
POWER TRANSMISSION
Filed Jan. 13, 1936
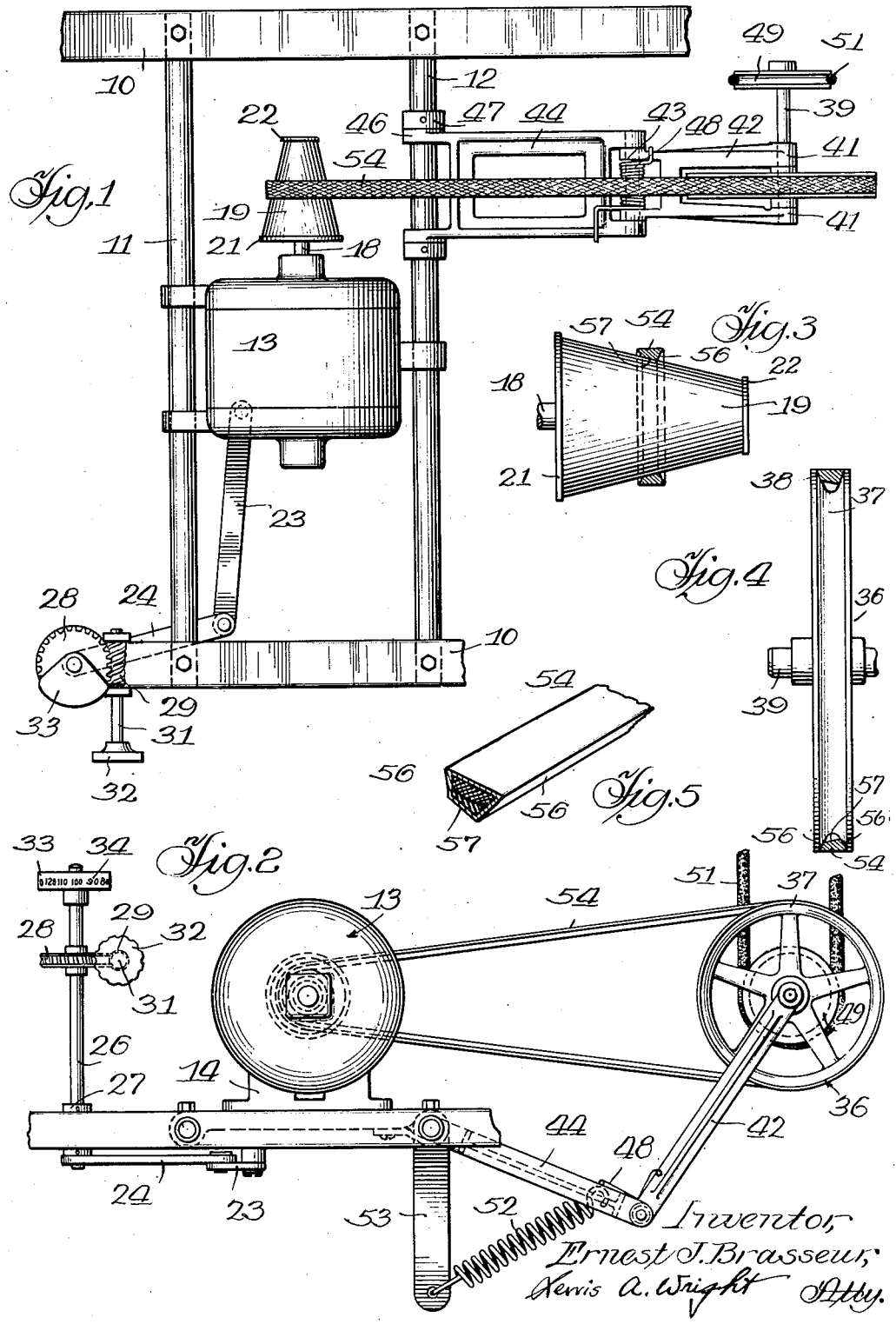

Patented Sept. 7, 1937

2,092,241

UNITED STATES PATENT OFFICE 2,092,241

POWER TRANSMISSION

Ernest J. Brasseur, Winnetka, Ill., assignor to A. B. Dick Company, Chicago, Ill., a corporation of Illinois Application January 13, 1936, Serial No. 58,811

7 Claims. (Cl. 74—217)

This invention relates to power transmission devices, and more particularly to variable speed transmissions of the belt connected type, and it has for its principal object to provide simple and improved apparatus of this nature which shall operate efficiently at any desired speed ratio within its range without material slippage and with minimum belt wear.

Speed changing devices have been heretofore proposed employing belt connected coned pulleys which may be shifted axially to vary the speed ratio between them. Such devices, however, subject the belt to an undesirable longitudinal twist between the pulleys and require the use of belt guides which consume power and increase wear. To avoid these difficulties, belts are sometimes run on auxiliary or idle belts, interposed between the pulleys and the transmission belt, but this expedient is complicated and expensive and is not practicable unless the pulleys are similar in construction.

It is also well-known to employ a belt having its side faces inclined in the form of a V and adapted to operate between and on similarly inclined flanges on the rims of the pulleys. These so-called "V-belts" are in extensive use and serve to greatly increase the efficiency of drives in which they may be employed. They have not been used in variable speed drives of the nature previously mentioned, however, because as heretofore constructed they do not provide proper contact with and power transmitting adhesion to pulleys having conical faces, and are not readily shifted on the surface of a pulley of frusto-conical form.

One of the objects of my invention is to provide a variable speed belt drive in which a single belt is operated between an axially shifted cone pulley and a sheave or pulley of the V-type, substantially without longitudinal twist and without excessive wear.

Another object of the invention is to provide a device of the character designated in which the belt shall have a slight tendency to climb toward the larger end of the cone pulley when in motion, and which shall thus serve to continuously keep itself taut.

A further object of the invention is to provide a belt for use in a transmission of the nature described which shall cooperate with a cone pulley by its inner face and with a sheave of the V-type by its side faces.

Other objects of the invention will appear from the following description taken in connection with the drawing, which forms a part of this specification, and in which:

Fig. 1 is a plan view of a transmission device constructed in accordance with my invention;

Fig. 2 is a side elevation of the apparatus shown in Fig. 1;

Fig. 3 is a detail view of a cone driving pulley, showing the belt thereon in section;

Fig. 4 is a detail of a driven belt sheave showing the belt thereon in section, and Fig. 5 is a fragmentary perspective view, partially in section, of a portion of the belt.

My invention is particularly well adapted for use in connection with small machines such as printing presses, duplicating machines, sewing machines and other light apparatus, but it is to be understood that the invention is not limited in this respect and is of general application.

Referring to the drawing, at 10 are shown spaced frame members which may form part of a support or stand on which the machine to be driven is mounted, and which are connected by tubular cross members 11 and 12 on which the device of this invention is carried. A prime mover, shown in the form of an electric motor 13, is slidably mounted on the cross members 11 and 12, being provided for this purpose with a base 14 having oppositely disposed arms 16, in which are formed bearings 17 adapted to engage the members 11 and 12 with an easily sliding fit. The motor shaft 18 projects from one end of the motor casing and is provided with a cone pulley 19 of any suitable construction, having flanges 21 and 22 at the large and small ends thereof, respectively.

The motor 13, and with it the pulley 19, is adjustably movable in the direction of its axis by means of mechanism including a link 23, pivotally connected at one end to the motor base 14, and actuated by a lever arm 24 secured to the lower end of a vertical shaft 26, journalled as at 27 in the frame member 10. The shaft 26 is provided near its upper end with a worm wheel 28, cooperating with a worm 29 mounted on a shaft 31 which carries a hand wheel 32. By turning this hand wheel 32, the cone pulley 19 may be axially adjusted by the operator to any desired position within the range of adjustment provided. To assist accurate adjustment of the pulley into any predetermined position, the shaft 26 may also carry a suitable dial 33 provided with a scale 34 which is conveniently arranged to read in terms of speed of the driven machine.

The transmission device of this invention also includes a driven pulley or sheave 36, adapted to receive power from the cone pulley 19 and transmit it to the driven machine. As shown, the sheave 36 is of conventional construction having a grooved rim 37 provided with inclined side walls or flanges 38 which are adapted to operatively engage the inclined side faces of a belt of the well-known V-type. The sheave 36 is secured to a shaft 39 journalled in suitable bearings 41 carried by and at the end of a bifurcated arm 42, the other end of which arm is pivotally connected as by a pin 43 to one end of an arm 44. The other end of arm 44 is provided with suitable bearings 46 by which it is pivotally mounted on the tubular member 12 between stop collers 47. A coiled tension spring 48 surrounds the pin 43 and is adapted to bear at one end on the arm 42 and at the other end on the arm 44, as shown, tending to straighten the angle between these arms and to urge the shaft 39 and the sheave 36 away from the shaft 18 and the pulley 19.

The shaft 39 projects through one of its bearings 41 and is provided at its outer end with a grooved pulley 49, connected by a suitable belt 51 to another pulley, not shown, to drive the machine. A tension spring 52 is connected between the arm 44 near the pin 43 and an arm 53 rigidly secured to the tubular member 12, urging the arm 44 to turn about member 12 on its bearings 46, and tending to lower the arm 42, the shaft 39 and the pulley 49 thus taking up slack in the belt 51 and keeping it taut.

The torque of the motor 13 in the device of this invention is transmitted to the sheave 36 from the cone pulley 19 by means of a belt 54. This belt 54 is preferably of the endless, inextensible type, and may be constructed in any suitable way such as by rubberized cords having rubberized fabric wearing surfaces vulcanized thereto, such as is shown for example in the U. S. Patent No. 1,400,539 to Gates. The belt 54 is of trapezoidal section, being provided with inclined side faces 56 adapted to operatively engage the side walls 38 of the sheave 36. It is also provided with an inner face 57 which is beveled to the angle of and adapted to engage and lie flat on the conical driving face of the pulley 19. By reason of the beveling of this belt surface 57 to agree with the angle of the cone pulley 19, the entire width of this face 57 engages the face of the driving pulley in any position, axially of the pulley, in which the belt may be running. The belt 54 is readily proportioned to give the face 57 a width sufficient to transmit any desired power, so that there is no appreciable slip even when the belt is operating near or at the small end of the pulley.

I have found in practice, that the belt does not run exactly in the mid-plane of the sheave 36 but bends or curves slightly out of that plane toward the small end of the pulley 19. The natural tendency of the belt is to slide down the inclined pulley face, and when at rest it may so slide a considerable distance toward the lower flange 22, depending on the initial tension in the belt. On starting up, however, a force immediately acts upon the belt causing it rapidly to climb the pulley 19 toward the larger end thereof, and this force continues to act on the belt until it is balanced by a component of the belt tension, acting in the opposite direction which increases as the belt tension is increased. The belt then continues to operate at the position on the pulley 19 thus determined.

It may be that the force causing such climbing of the belt on the pulley is a component of the forces produced in the belt by the different velocities of its side faces in passing over the pulley. In any event, such force exists and does in fact cause the belt to bend slightly out of its initial position and then to climb toward the larger pulley diameter. This tendency is of material assistance in keeping the belt properly tightened and in preventing slippage.

The operation of the device will be apparent from the foregoing description. With the drive in operation, the operator can vary the speed of the driven sheave by turning the hand wheel 32 so as to move the pulley 19 in either direction, and any desired speed ratio may be thus obtained, from the lowest speed when the belt is running adjacent the flange 22 to the highest speed when it is running adjacent the flange 21. As the pulley is shifted to operate nearer its larger end, the shaft 39 is drawn nearer to the motor shaft 18, the arm 42 pivoting about the pin 43 against spring 48 to permit this. During such movement, the pulley 49 is also moved through a slight arc, but the tension in belt 51 is continuously maintained through the arms 42 and 44 by the joint action of springs 48 and 52.

It will be evident that my invention provides a simple, inexpensive and efficient drive, capable of transmitting power with little slip and with minimum wear of the parts.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. A variable speed power transmission comprising parallel shafts, a sheave on one of the shafts having a V-shaped rim, a cone pulley on the other shaft, a belt operatively connecting said sheave and pulley having inclined side faces to engage the sheave rim and an inclined inner face to engage the pulley, resilent means urging the sheave shaft away from the pulley shaft and means to move the pulley and its shaft axially.

2. A power transmission comprising a flanged sheave, a conical pulley, and an endless belt of trapezoidal section having beveled side faces to engage the sheave flanges and a beveled inner face to engage the conical pulley face.

3. A power transmission comprising a sheave having a V-shaped rim, a conical pulley, and a belt of trapezoidal section having side faces beveled to engage the sheave rim and having an inner face beveled to the angle of and engaging the conical pulley surface.

4. A power transmission comprising a sheave having a rim with inclined side walls, a pulley having a conical surface and a belt of trapezoidal section having beveled sides adapted to engage the inclined walls of said rim and an inner surface beveled to the cone angle of the pulley and engaging the conical surface thereof.

5. A variable speed power transmission comprising a sheave, a conical pulley, a belt having side faces beveled to engage the sheave and an inner face beveled to engage the pulley, and means to move the pulley axially to vary the operative diameter thereof.

6. A variable speed power transmission comprising a sheave, a conical pulley, a belt having side faces beveled to engage the sheave and an inner face beveled to engage the pulley, means urging the sheave and pulley axes apart while maintaining said axes parallel, and means to adjustably move the pulley axially.

7. A power transmission comprising a belt of trapezoidal section, a sheave adapted to engage the side faces of the belt and to guide said belt, and a conical pulley adapted to engage the inner face of the belt throughout the width of said inner face.

ERNEST J. BRASSEUR.